(12) United States Patent
Naoe

(10) Patent No.: US 7,166,317 B2
(45) Date of Patent: Jan. 23, 2007

(54) METHOD FOR MANUFACTURING MAGNETIC RECORDING MEDIUM

(75) Inventor: Koji Naoe, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 263 days.

(21) Appl. No.: 10/678,094

(22) Filed: Oct. 6, 2003

(65) Prior Publication Data

US 2004/0091610 A1    May 13, 2004

(30) Foreign Application Priority Data

Oct. 4, 2002  (JP) .............................. 2002-292699
Oct. 2, 2003  (JP) .............................. 2003-343999

(51) Int. Cl.
*B05D 5/12*    (2006.01)

(52) U.S. Cl. ................ 427/127; 427/128; 427/209; 427/407.1

(58) Field of Classification Search ................ 427/127, 427/128, 209, 407.1
See application file for complete search history.

(56) References Cited

U.S. PATENT DOCUMENTS

| | | | | |
|---|---|---|---|---|
| 5,510,140 A | * | 4/1996 | Kurose et al. | 427/131 |
| 5,567,502 A | * | 10/1996 | Miyabara et al. | 428/141 |
| 5,772,900 A | * | 6/1998 | Yorita et al. | 210/805 |
| 2003/0021891 A1 | | 1/2003 | Naoe et al. | |

FOREIGN PATENT DOCUMENTS

JP          7-14159        1/1995

* cited by examiner

*Primary Examiner*—Alain L. Bashore
(74) *Attorney, Agent, or Firm*—Sughrue Mion, PLLC

(57) ABSTRACT

The method is for manufacturing the magnetic recording medium in which a magnetic coating containing a ferromagnetic powder and a binder is applied on a nonmagnetic support. The magnetic coating includes: a magnetic liquid containing a ferromagnetic powder and a binder, and an abrasive liquid containing an abrasive and a solvent. The abrasive liquid may further contain the binder. The magnetic liquid and the abrasive liquid are each separately subjected to dispersion treatment, then the abrasive liquid is filtered, and then the magnetic liquid and the abrasive liquid are mixed. The obtained magnetic recording medium has a smooth magnetic layer surface, good electromagnetic conversion properties and excellent running durability and shows little wear of a head.

8 Claims, 4 Drawing Sheets

METHOD FOR MANUFACTURING MAGNETIC RECORDING MEDIUM

BACKGROUND OF THE INVENTION

1. Field of the Invention

The present invention relates to a method for manufacturing a magnetic recording medium, particularly to a method for manufacturing a high-density magnetic recording medium showing little wear of a head and excellent in running durability.

2. Description of the Related Art

In the magnetic recording in recent years, the wavelength of recording tends to be shorter with the increase of density. The requirement is then increasing for a magnetic recording medium to reduce a spacing loss by providing surface properties of a magnetic layer with higher smoothness. One of the methods to provide surface properties of a magnetic layer with smoothness is to strengthen the dispersion of the magnetic liquid, which is applied on a support to form the magnetic layer in manufacture of the magnetic recording medium. In common media dispersion, the dispersion has been strengthened by using as media beads the media having high specific gravity such as zirconia for dispersing long time, by increasing the loading ratio of the media beads or by increasing peripheral velocity.

In the case where the surface properties of the magnetic layer are provided with smoothness by these methods, finely divided particles of abrasives are unevenly distributed on the very surface layer of the magnetic layer, causing problems such as the reduction of output due to the reduction of the degree of filling of the magnetic material in the very surface layer and the increase of noise in the magnetic medium Moreover, die reduction of the height of projected abrasives on the surface of the magnetic layer causes a problem of reducing running durability. Furthermore, the above-described problems will become more obvious, if the abrasives to be used are made finely divided particles for providing smoothness to the surface properties of the magnetic layer.

Japanese Patent Application Publication No. 07-014159 discloses one of the methods to solve this problem in which the abrasives and carbon black in a magnetic liquid are formulated to prepare a paste, separately from the magnetic coating including a ferromagnetic powder and a binder, and they are separately subjected to dispersion treatment, before mixing. In this method, a magnetic coating, an abrasive paste liquid and a carbon black paste liquid are each separately dispersed into optimum dispersion states, and they are mixed and prepared to produce a coating liquid. This method has substantially solved the problem of the degree of filling in the above-described magnetic layer and the problem of the reduction of durability due to the reduction of the projected height on the surface of a magnetic layer.

However, the method for producing the magnetic coating by separate dispersion and mixing has newly caused the problem of the increase of wear of a magnetic head to be in contact with the magnetic recording medium due to the aggregation of the magnetic material and the problem of the reduction of durability due to the aggregation of carbon black Thus, it is difficult to manufacture a magnetic recording medium that has a smoother magnetic layer surface, high output and excellent running durability and shows little wear of a head. It is desired that these properties are compatible with each other.

SUMMARY OF THE INVENTION

It is an object of the present invention to provide a method for manufacturing a magnetic recording medium that has a smooth magnetic layer surface and excellent running durability and shows little wear of a head, by solving the above-described problems.

In order to attain the above-described object, the present invention is directed to a method for manufacturing a magnetic recording medium in which a magnetic coating is applied on a nonmagnetic support, the magnetic coating including: a magnetic liquid containing a ferromagnetic powder and a binder; and an abrasive liquid containing an abrasive and the binder, the method comprising the steps of: subjecting the magnetic liquid to dispersion treatment; subjecting the abrasive liquid to dispersion treatment separately from the magnetic liquid, and then filtering the abrasive liquid; and then mixing the magnetic liquid and the abrasive liquid.

The present invention is also directed to a method for manufacturing a magnetic recording medium in which a magnetic coating is applied on a nonmagnetic support, the magnetic coating including: a magnetic liquid containing a ferromagnetic powder and a binder; and an abrasive liquid containing an abrasive and a solvent, the method comprising the steps of: subjecting the magnetic liquid to dispersion treatment; subjecting the abrasive liquid to dispersion treatment separately from the magnetic liquid, and then filtering the abrasive liquid; and then mixing the magnetic liquid and the abrasive liquid.

According to the present invention, the magnetic liquid and the abrasive liquid are each separately subjected to dispersion treatment, then the abrasive liquid is filtered, and then the both liquids are mixed, so that coarse particles in the abrasives can be removed. Thus, a magnetic recording medium that Us a smooth magnetic layer surface, good electromagnetic conversion properties and excellent running durability and shows little wear of a head can be obtained.

In the present invention, the dispersion treatment of the abrasive liquid is preferably carried out by applying an ultrasonic wave. This dispersion method can better ensure the effect of the present invention.

Furthermore, in the present invention, a cross-flow type filtration apparatus is preferably used to carry out classification in the filtration of the abrasive liquid. The effect of the present invention can be exerted securely since the use of the cross-flow type filtration apparatus ensures the removal of not only coarse particles in the abrasives but also fine particles. Specifically, the removal of fine particles has also the effect of reducing the noise of a medium. In addition, the classification of the abrasives can control the particle distribution. Consequently, the amount to be added of the abrasives can be increased and the strength of the magnetic layer can be secured.

As used herein, the term "classification" means "the operation for obtaining the abrasive products that have a specific particle size that satisfies a standard from the abrasive grains containing coarse particles as well as fine particles after grinding" (Glossary of Cutting, Grinding and Polishing Terms, edited by Society of Grinding Engineering, 1995, published by Kogyo Chosakai Publishing Co., Ltd.).

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
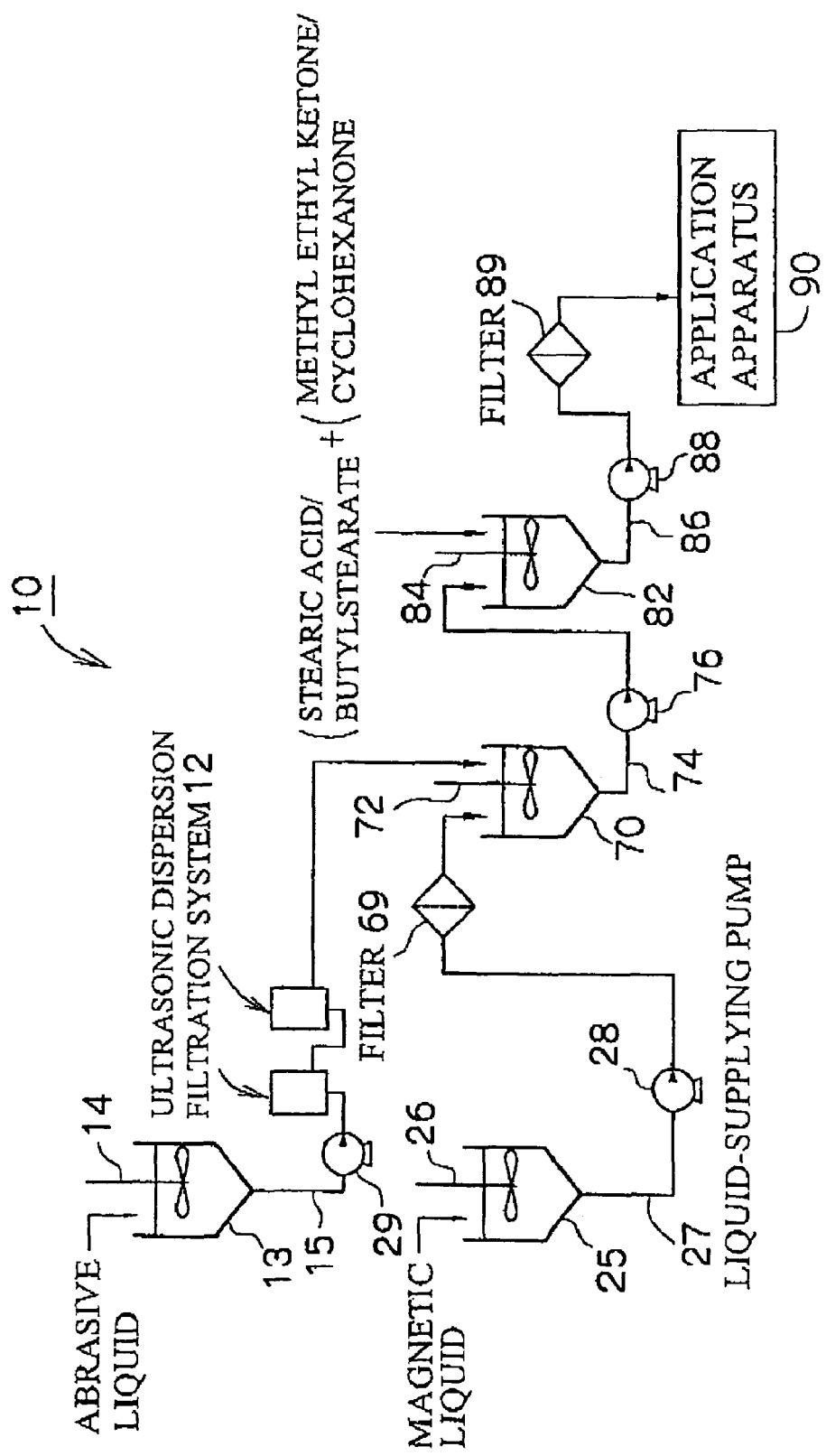
FIG. 1 is a general block diagram of the magnetic coating producing apparatus for use in the embodiment of the present invention.
Figure 2:
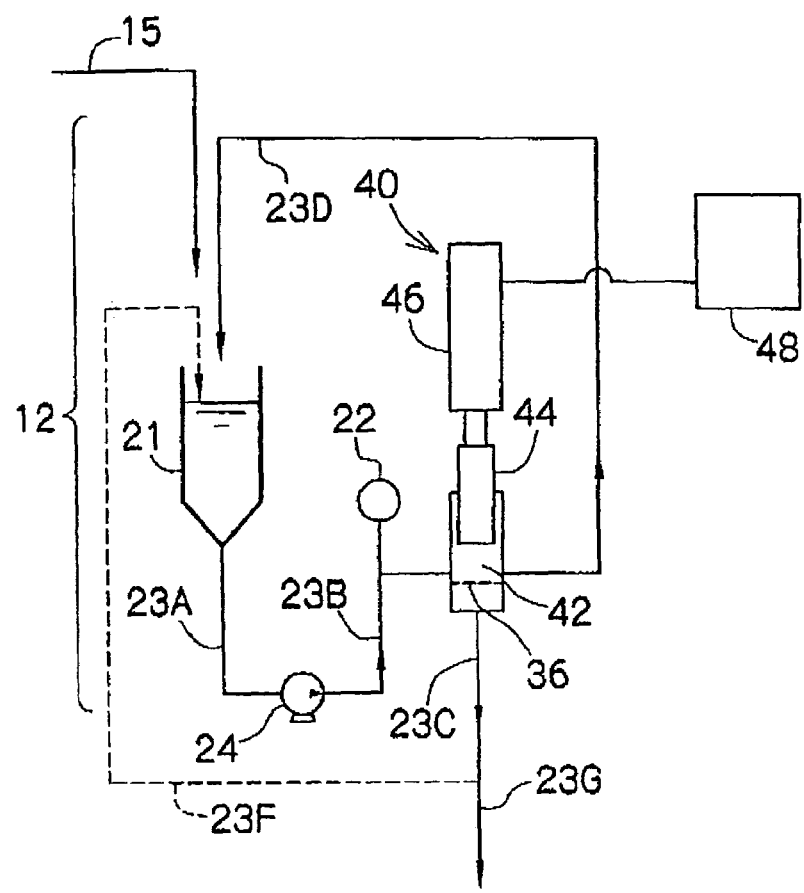
FIG. 2 is a block diagram illustrating an example of the embodiment of an ultrasonic dispersion filtration system.
Figure 3:
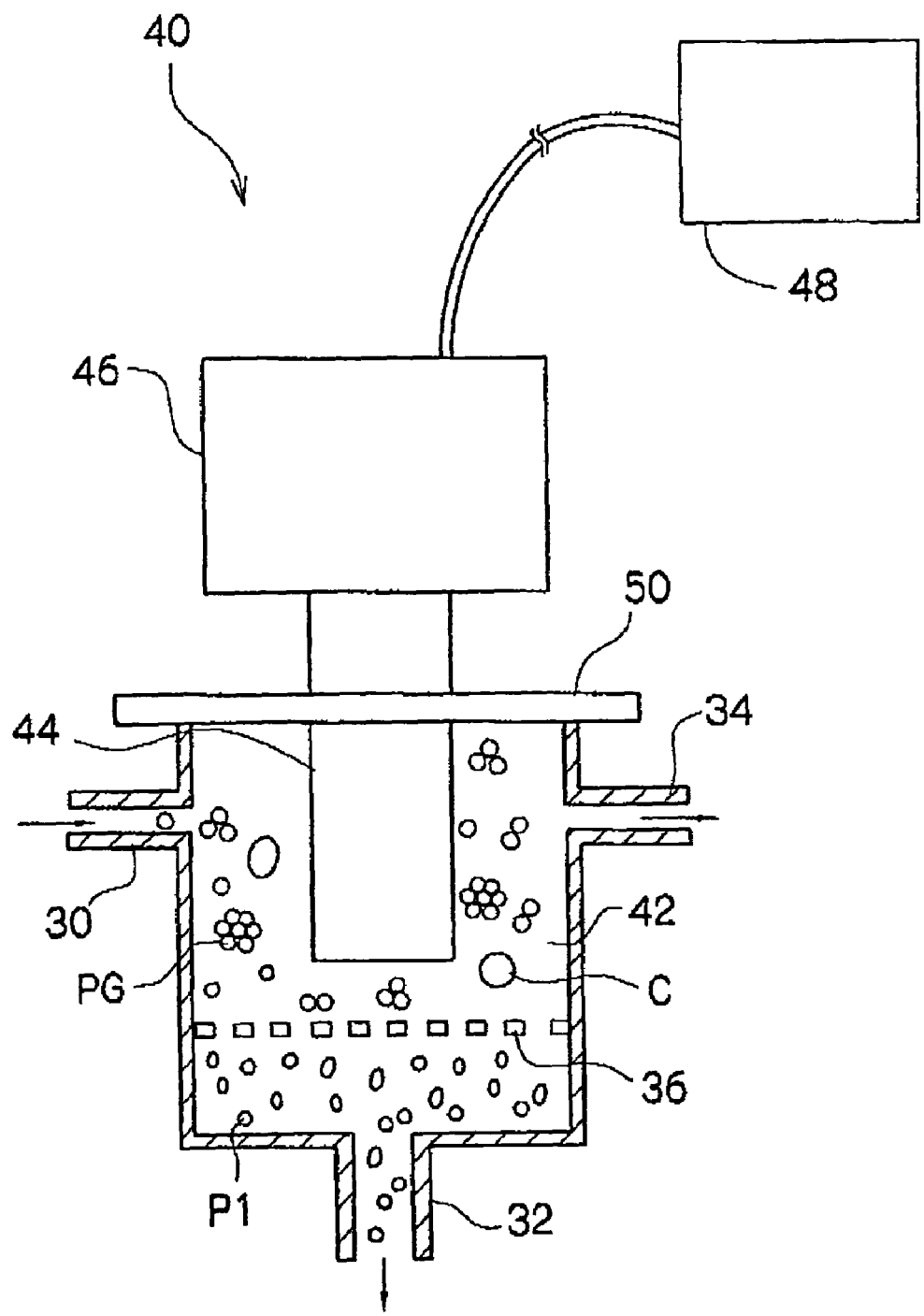
FIG. 3 is a detailed sectional view of an ultrasonic dispersion filtration apparatus for use in an ultrasonic dispersion filtration system.

A preferred embodiment of a magnetic coating producing apparatus 10 for use in a method for manufacturing the magnetic recording medium according to the present invention will now be described in detail with reference to the accompanying drawings. FIG. 1 is a general block diagram of the magnetic coating producing apparatus 10; FIG. 2 is a detailed view of an ultrasonic dispersion filtration system 12 for subjecting an abrasive liquid to dispersion treatment and filtration treatment; and FIG. 3 is a detailed sectional view of an ultrasonic dispersion filtration apparatus 40 for use in the ultrasonic dispersion filtration system 12.

In the magnetic coating producing apparatus 10, a supply system of the abrasive liquid and a supply system of a magnetic liquid are provided in parallel, and are installed such that they join at a mixing tank 70. The supply system of the abrasive liquid is composed of a liquid tank, a liquid supply device, an ultrasonic dispersion filtration system and the like. Specifically, the supply system of the abrasive liquid comprises the liquid tank 13, a stirrer 14 with its end positioned in the liquid tank 13, a liquid-supplying pipe 15 from the liquid tank 13, a liquid-supplying pump 29 and two-step ultrasonic filtration dispersion systems 12, 12 connected in series. The detail of the ultrasonic dispersion systems 12 will be described hereinafter.

On the other hand, the supply system of the magnetic liquid comprises a liquid tank 25, a stirrer 26 with its end positioned in the liquid tank 25, a liquid-supplying pipe 27 from the liquid tank 25, a liquid-supplying pump 28 and a filter 69.

The liquids from both supply systems join at the mixing tank 70, and then treated in a single system. Specifically, the mixed solution agitated with a stirrer 72 in the mixing tank 70 is sent to an addition tank 82 by a liquid-supplying pipe 74 from the mixing tank 70 and a liquid-supplying pump 76. Stearic acid and the like are added in the addition tank 82. The mixed solution agitated with the stirrer 84 in the addition tank 82 is sent to an application apparatus 90 by a liquid-supplying pipe 86 from the addition tank 82 and a liquid-supplying pump 88 through a filter 89.

As illustrated in FIG. 2, the ultrasonic dispersion filtration system 12 for subjecting the abrasive liquid to dispersion treatment and filtration treatment is composed of a liquid tank, a liquid supply device, an ultrasonic dispersion filtration apparatus and the like. Specifically, the ultrasonic dispersion filtration system 12 comprises the liquid tank 21, a liquid-supplying pipe 23A from the liquid tank 21, a liquid-supplying pump 24, an ultrasonic dispersion filtration apparatus 40, a pressure gauge 22 for measuring the pressure within a pipe 23B between the liquid-supplying pump 24 and the ultrasonic dispersion filtration apparatus 40, a liquid-supplying pipe 23C for supplying the abrasive liquid to the downstream of the ultrasonic dispersion filtration apparatus 40, and a return pipe 23D for returning the return liquid from the ultrasonic dispersion filtration apparatus 40 to the liquid lank 21. The end of the liquid-supplying pipe 23C is switchably connected to a liquid-supplying pipe 23G for supplying the abrasive liquid to the downstream and a return pipe 23F for returning the abrasive liquid to the liquid tank 21.

In the ultrasonic dispersion filtration system 12, a cross-flow type ultrasonic dispersion filtration apparatus 40 is employed, as illustrated in FIG. 3. The cross-flow type refers to the type that is described versus a dead end type in the filtration apparatus (filter). Specifically, cartridge filters and the like that are commonly used are of the dead-end type in which there are provided only a liquid supply port and a liquid discharge port and no bypass. On the other hand, the cross-flow type is the system in which there are provided a liquid supply port and a liquid discharge port, and in addition a return pipe to supply the liquid that could not be filtered again to the liquid supply port through the return pipe.

In FIG. 3, a liquid tank 42 of the ultrasonic dispersion filtration apparatus 40 is a cylindrical container, and a liquid discharge port 32 is connected at the lower end thereof. In addition, there are connected a pipe 30 liquid supply port) at the upper left side and a pipe 34 liquid bypass port) at the upper right side. Further, there is provided a filter 36 at the lower part within the liquid tank 42, such that only the liquid that has passed through the filter 36 can flow out through the liquid discharge port 32 and any other liquid flows out through the pipe 34 (liquid bypass port).

The upper end of the liquid tank 42 of the ultrasonic dispersion filtration apparatus 40 is sealed by a flange 50 of a vibrator 44 to be described below to form a sealed container. The vibrator 44 having a cylindrical shape is disposed within the liquid tank 42, such that an ultrasonic wave can be applied to the liquid passing through the liquid tank 42. The flange 50 is integrally formed with the vibrator 44.

A converter 46 is fixed at the upper end of the vibrator 44 and electricity is supplied to the converter 46 from a power supply 48. Consequently, when the ultrasonic dispersion filtration apparatus 40 is stared, the ultrasonic vibration is excited by the converter 46 and an ultrasonic wave is applied to the inside of the liquid tank 42 by the vibrator 44.

By employing the ultrasonic dispersion filtration apparatus 40 of the above-described structure, the abrasive liquid that has flowed into the liquid tank 42 is subjected to dispersion treatment by applying an ultrasonic wave and filtered by the filter 36 in the neighborhood of the ultrasonic application part, and only the liquid that has passed though the filter 36 flows from the liquid discharge port 32 and is sent to the downstream.

In FIG. 3, primary particles P1, P1, . . . that are subjected to dispersion treatment by applying an ultrasonic wave have passed through the filter 36, and aggregated particles PG and foreign matters C cannot pass through the filter 36 and are circulated again through the pipe 34.

As the flow-type ultrasonic dispersion filtration apparatus 40 as described above, for example, the flow-type ultrasonic dispersion apparatus made by Nihon Seiki Seisakusho Co., Ltd., brand name: US-1200TCVP, can be modified for use. The specifications of this machine include an ultrasonic frequency of 20 kHz, a MAX amplitude of 30 μm, a nominal output of 1,200 W, a diameter of the ultrasonic irradiation part of 50 mm and the like. The inside diameter of the pipes 30, 32 and 34 is made to be 14 mm.

As for the filter 36, for example, those prepared by sintering stainless steel fiber and having a diameter of 80 mm, a thickness of 1.5 mm and a nominal filtration performance of 1 μm can be used. In the case of the classification to be described below, those having a nominal filtration performance of 0.1 μm can be used to remove finely divided particles.

The cross-flow type ultrasonic dispersion filtration apparatus is not an essential structure in the embodiment of the present invention, but the structure may be a combination of an ultrasonic dispersion apparatus and a dead-end type filter (common cartridge filter, etc.). Namely, coarse aggregated particles can be removed first by subjecting the abrasive liquid to dispersion treatment by applying an ultrasonic wave, and then by subjecting it to filtration.

However, the flow rate of the solution may be limited by filter plug, or the frequency of filter exchange may be high, in the case of the dead-end type filter. Therefore, it is preferred to employ the cross-flow type ultrasonic dispersion filtration apparatus. In particular, the cross-flow type ultrasonic dispersion filtration apparatus in which the filter is disposed in the neighborhood of the ultrasonic irradiation part as shown in FIG. 3 is preferred because the aggregated particles are filtered while being broken down.

Various known materials can be used for the various components for use in the above-described magnetic coating producing apparatus 10. However, it is preferable to employ those materials that will not produce contamination and corrosion.

When the ultrasonic dispersion filtration system 12 is to be constructed in a two-step series arrangement to classify the abrasive particles, for example, the system will be the constructed as follows. The first step of the ultrasonic dispersion filtration system 12 uses the structure shown in FIG. 2. A filter of the mesh size for removing coarse aggregated particles or the like is used for the filter 36. In this case, only the liquid that has passed through the filter 36 is sent to the downstream through the liquid discharge port 32 (refer to FIG. 3) and the liquid-supplying pipe 23C (refer to FIG. 2), as shown in FIGS. 2 and 3.

Figure 4:
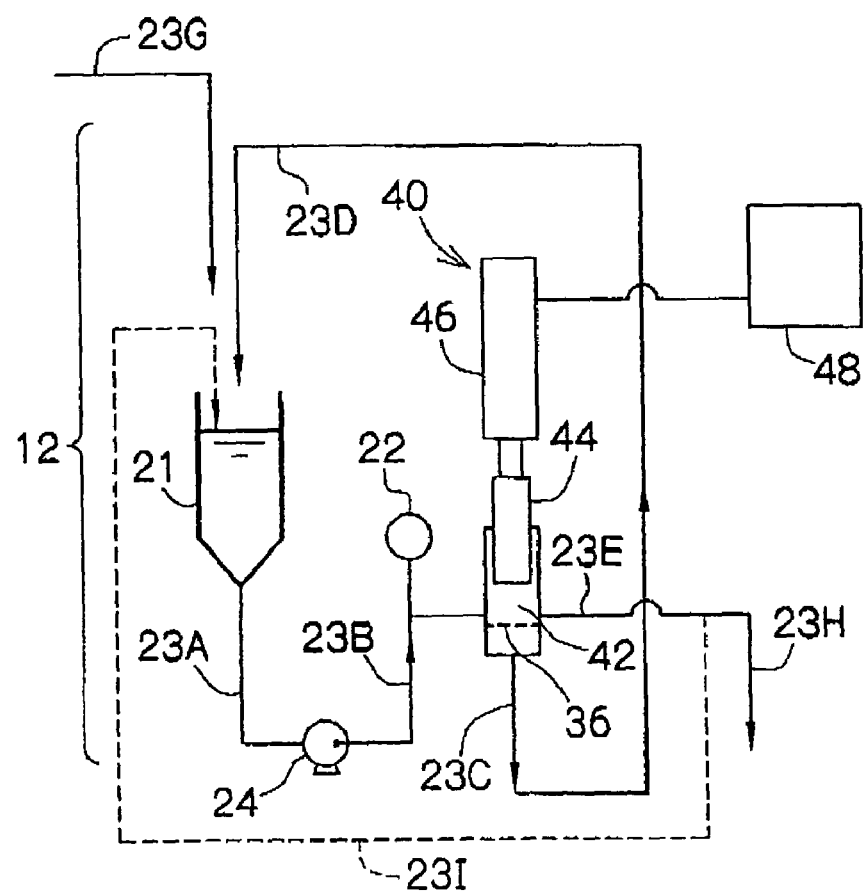
FIG. 4 is a block diagram illustrating another example of the embodiment of an ultrasonic dispersion filtration system.

On the other hand, the second step of the ultrasonic dispersion filtration system 12 uses the structure shown in FIG. 4, which is similar to the structure shown in FIG. 2 and differences between them are described below. In FIG. 4, the liquid-supplying 23C is connected to the return pipe 23D, and the return liquid from the ultrasonic dispersion filtration apparatus 40 is returned to the liquid lank 21. The pipe 34 (liquid bypass port) shown in FIG. 3 is connected to the liquid-supplying pipe 23E, and the liquid that has not passed through the filter 36 of the ultrasonic dispersion filtration apparatus 40 is supplied to the downstream. The end of the liquid-supplying pipe 23E is switchably connected to a liquid-supplying pipe 23H for supplying the abrasive liquid to the downstream and a return pipe 23I for returning the abrasive liquid to the liquid tank 21.

In the ultrasonic dispersion filtration system 12 of the structure shown in FIG. 4, a filter of the mesh size for removing fine particles or the like is used for the filter 36. In this case, only the liquid that has not passed through the filter 36 is sent to the downstream through the liquid bypass port 34 (refer to FIG. 3) and the liquid-supplying pipe 23E (refer to FIG. 4), as shown in FIGS. 3 and 4. The liquid that has passed through the filter 36 is circulated again through the liquid discharge port 32 (refer to FIG. 3), the liquid-supplying pipe 23C and the return pipe 23D (refer to FIG. 4).

By the above-described structure, the particles to be classified that are at the upper limit or above and at the lower limit or below of the abrasive particles are removed to effectively classify the abrasive particles.

The specification of the filter 36 to be used for removing the particles having the upper limit size or above is preferably $X \leq 10K$, more preferably $X \leq 5K$, most preferably $X \leq 2K$, where X designates the filtration precision of the filter 36 and K designates the average particle size of the abrasive (by SEM observation), in terms of reducing wear of a magnetic head to be in contact with the resulting magnetic recording medium.

On the other hand, the specification of the filter 36 to be used for removing the particles having the lower limit size or below is preferably $Y \geq 0.1K$, more preferably $Y \geq 0.2K$, most preferably $Y \geq 0.5K$, where Y designates the filtration precision of the filter 36 and K designates the average particle size of the abrasive (by SEM observation), in terms of reducing noise in the magnetic recording medium.

In the production method according to the embodiment of the present invention, the abrasive liquid that is to be added to the liquid tank 13 may also be subjected to the ultrasonic dispersion treatment after the concentration of the liquid is reduced as necessary. In this case, the abrasive liquid may also be subjected to preliminary dispersion treatment by a sand grinder machine (sand mill) as necessary before the ultrasonic dispersion treatment. It is preferable to use glass beads to the dispersion treatment by the sand mill, and more preferably zirconia ($ZrO_2$) beads are used.

After the preliminary dispersion treatment process, it is preferable to reduce the concentration of the abrasive by diluting the abrasive liquid by a coating solvent, and the particle size measurement of the abrasive may also be carried out together. The particle size measurement can be carried out in various methods, and so called Thi-laser system measurement method may also be used.

The structure of the magnetic recording medium to which the embodiment of the present invention is applied and various materials to be used for it will now be described. First, the abrasives to be used for the magnetic layer of the embodiment of the present invention will be described, and then the structure of the magnetic recording medium and various materials such as a magnetic powder will be described.

Commonly used materials can be used for the abrasives for use in the magnetic layer of the embodiment of the present invention. More specifically, examples of the abrasives include α-alumina, γ-alumina, fused alumina, corundum, synthetic corundum, silicon carbide, chromium oxide ($Cr_2O_3$), diamond, synthetic diamond, garnet, emery (main components: corundum and magnetite), α-$Fe_2O_3$ and the like. These abrasives have Mohs hardness of 6 or above.

Examples of commercially available abrasives include AKP-10, AKP-12, AKP-15, AKP-20, AKP-30, AKP-50, AKP-1520, AKP-1500, HIT-50, HIT-60A, HIT-70, HIT-80, and HIT-100 made by Sumitomo Chemical Co., Ltd.; G5, G7, S-1 and "Chromium Oxide K" made by Nippon Chemical Industrial Co., Ltd, UB40B made by C.Uyemura & Co., Ltd.; WA8000 and WA10000 made by Fujimi Incorporated; and TF100, TF140 and TF180 made by Toda Kogyo Corp.

In these abrasives, the particles having an average particle size in the range of 0.05 to 3 μm have large effects and preferably the particles having an average particle size in the range of 0.05 to 1.0 μm have larger effect.

Typical binders to be used in combination with the abrasives include a vinyl chloride copolymer, a polyurethane resin and the like. The weight ratio of the binder to the abrasives that can be preferably employed is in the range of 0 to 1/5.

The total amount of the abrasives to be added is in the range of 1 to 20 parts by weight, preferably in the range of 1 to 15 parts by weight, relative to 100 parts by weight of the magnetic material. Because the amount less than 1 part by weight will be too small to obtain sufficient durability, and the amount more than 20 parts by weight will have the tendency to reduce surface properties and the degree of filling.

The embodiment of the present invention can be preferably used in the method for manufacturing the magnetic recording medium in which a lower coating layer mainly containing a nonmagnetic inorganic powder and a binder is provided on a nonmagnetic support, and a magnetic layer containing a ferromagnetic powder, an abrasive and a binder is provided on the lower coating layer.

The magnetic layer may be a single layer or may be configured by two or more layers. In the latter case, the magnetic layers may be provided adjacent to each other or other layers than the magnetic layer may be provided between the magnetic layers depending on the purpose. Known structure of the layers can be employed for the magnetic layer.

The magnetic layer thickness in the embodiment of the present invention means the thickness of the uppermost layer (outermost layer) of the magnetic layers when they are composed of multiple layers. In this case, the magnetic layer thickness is preferably from 0.02 μm to 0.3 μm.

Examples in which the magnetic layer is formed by multiple layers include combinations of magnetic layers in which a ferromagnetic powder selected from a ferromagnetic iron oxide, a ferromagnetic cobalt-modified iron oxide, a $CrO_2$ powder, a hexagonal ferrite powder and various ferromagnetic metal powders is dispersed in a binder. In this case, it is also possible to combine the magnetic layers that contain the same type of ferromagnetic powders but different in elemental composition, powder size or the like.

In the embodiment of the present invention, the magnetic recording medium preferably has the structure in which a nonmagnetic layer is provided between a magnetic layer containing a ferromagnetic metal powder or a hexagonal ferrite powder and a support.

Various examples of inorganic compounds as a nonmagnetic powder for use in the nonmagnetic layer include, for example, α-alumina having an α-content of 90% or more, β-alumina, γ-alumina, silicon carbide, chromium oxide, cerium oxide, hematite (α-iron oxide), goethite (ferric oxyhydrate), corundum, silicon nitride, titanium carbide, titanium oxide, silicon dioxide, boron nitride, zinc oxide, calcium carbonate, calcium sulfate, barium sulfate and the like, used singly or in combination with each other. As for hematite and goethite, the hematite and goethite that are the intermediate raw materials for a magnetic iron oxide and a ferromagnetic metal powder prepared by an iron oxide reduction process are also preferred.

The nonmagnetic powder to be used may be surface treated in order to increase the interaction with the binder to be used and to improve dispersibility. The materials for use in the surface treatment include Sit Al, and compounds containing elements such as Al and Si. By treating with these materials, the layer made of at least silica, alumina, silica-alumina or the like way be formed on the surface of the nonmagnetic powder, or the surface of the nonmagnetic powder may be treated with a coupling agent such as a silane coupling agent or a titanium coupling agent Preferably, the tap density is in the range from 0.3 to 2 g/ml; the water content is in the range from 0.1 to 5% by weight; the pH is in the range from 2 to 11; and the specific surface area by the BET method (SBET) is in the range from 5 to 100 m²/g.

The ferromagnetic powder for use in the embodiment of the present invention is preferably a ferromagnetic metal powder and a hexagonal ferrite powder.

The saturation magnetization of a ferromagnetic metal powder is generally from 60 to 170 A·m²/kg (60 to 170 emu/g), preferably from 80 to 170 A·m²/g (80 to 170 emu/g). The treatment with the compounds described in Japanese Patent Application Publication Nos. 61-52327 and 07-94310 or the coupling agents having various substituents immediately after reduction and before slow oxidation is effective in that it can enhance the saturation magnetization.

The coercivity of a ferromagnetic metal powder ranges from $13.5 \times 10^4$ to $23.8 \times 10^4$ A/m (1,700 to 3,000 Oe), preferably from $14.3 \times 10^4$ to $22.3 \times 10^4$ A/m (1,800 to 2,800 Oe).

The ferromagnetic metal powders for use in the magnetic layer of the embodiment of the present invention are preferably ferromagnetic alloy powders mainly containing α-Fe. These ferromagnetic metal powders may contain, other than specific elements, the elements such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B.

In particular, at least one of Al, Si, Ca, Y, Ba, La, Nd, Co, Ni and B is preferably contained other than α-Fe, more preferably at least one of Co, Y and Al. The content of Co is, relative to Fe, preferably from 0 at % to 40 at %, more preferably from 10 at % to 40 at %, most preferably from 20 at % to 35 at %. The content of Y is preferably from 1 at % to 15 at %, more preferably from 3 at % to 10 at %, most preferably from 4 at % to 9 at %. The content of Al is preferably from 2 at % to 20 at %, more preferably from 3 at % to 20 at %, most preferably from 4 at % to 16 at %.

It is preferable that in the ferromagnetic powders, Co is contained in an amount from 10 to 40 at %; Al is contained in an amount from 2 to 20 at %; and Y is contained in an amount from 1 to 15 at %, relative to Fe.

These ferromagnetic metal powders may be preliminarily treated, before being dispersed, with a dispersant, a lubricant, a surfactant, an antistatic agent or the like to be described below. Specifically, these treatments are described in any one of Japanese Patent Publication Nos. 44-14090, 45-18372, 47-22062, 47-22513, 46-28466, 46-38755, 47-4286, 47-12422, 47-17284, 47-18509, 47-18573, 39-10307 and 46-39639, and U.S. Pat. Nos. 3,026,215; 3,031,341; 3,100,194; 3,242,005 and 3,389,014.

The ferromagnetic metal powders may contain a small amount of hydroxides or oxides. The ferromagnetic metal powders prepared by known production methods may be used. The known production methods include the methods such as: a method for reducing a composite organic acid salt (mainly oxalate) with a reducing gas such as hydrogen; a method for reducing iron oxide with a reducing gas such as hydrogen to obtain a powder of Fe or Fe—Co; a method for pyrolytically decomposing a metal carbonyl compound; a reduction method by adding sodium borohydride, hypophosphites or hydrazine to an aqueous solution of ferromagnetic metals; and a method for vaporizing metals in a low pressure inert gas to obtain powders.

Any of the thus obtained ferromagnetic metal powders may be used after subjected to any one of the known slow oxidation treatment methods selected from a method for immersing in an organic solvent and then drying; a method for immersing in an organic solvent, feeding an oxygen-containing gas to form an oxidized film on the surface and then drying; and a method for forming an oxidized film on the surface by adjusting the partial pressure of an oxygen gas and an inert gas without using an organic solvent.

The ferromagnetic metal powder in the magnetic layer of the embodiment of the present invention is expressed in 1 BET to be 40–80 m$^2$/g, preferably 45–70 m$^2$/g. Noise will increase if it is less than 40 m$^2$/g, and good surface properties will tend to be difficult to obtain if it is larger than 80 m$^2$/g.

The crystallite size of the ferromagnetic metal powders in the magnetic layer for use in the embodiment of the present invention is preferably from 8 to 23 nm, more preferably from 8 to 16 nm, most preferably from 8 to 12.5 nm. The average major axis length of the ferromagnetic metal powders is preferably from 30 to 190 nm, more preferably from 30 to 100 nm. The acicular ratio of the ferromagnetic metal powders is preferably from 2.0 to 10.0, more preferably from 3.0 to 9.0, and the coefficient of variation of the acicular ratio is preferably from 5 to 30%, more preferably from 5 to 28%.

A magnetic recording medium that mainly contains Fe as the ferromagnetic powder in the magnetic layer and has a major axis length of from 30 to 100 nm and a crystallite size of from 8 to 16 nm is most preferred.

The water content of the ferromagnetic metal powder is preferably from 0.01 to 2% by weight. The water content is preferably optimized depending on the type of the binder to be described below.

The tap density of the ferromagnetic metal powder is preferably from 0.2 to 0.8 g/ml. If it is larger Fan 0.8 g/ml, the powder would not be uniformly oxidized in the slow oxidization of the powder, which may result in difficulty in safe handling of the powder or reduction of the magnetization of the resultant tape with time. The tap density of 0.2 g/ml or less may result in insufficient dispersion.

The pH of the ferromagnetic metal powder is preferably optimized by the combination with the binder to be used The range is typically from 4 to 12, preferably from 6 to 10. The ferromagnetic metal powder may be surface treated with Al, Si, P or oxides thereof as necessary. The amount existing on the surface is from 0.1 to 20% by weight relative to the ferromagnetic metal powder after the treatment. The surface treatment is preferred in that the adsorption of a lubricant such as a fatty acid is reduced to 10 mg/m$^2$ or less.

The ferromagnetic metal powder may contain soluble inorganic ions of elements such as Na, Ca, Fe, Ni and Sr. Although it is preferred that these inorganic ions are not contained in essence, 200 ppm or less of them will not particularly influence the properties.

Moreover, the ferromagnetic powder for use in the embodiment of the present invention preferably has less quantity of holes, the value being 20% by volume or less, more preferably 5% by volume or less. The shape of the powder may be acicular, riziform or fusiform.

It is preferred that the switching-field distribution (SFD) of the ferromagnetic metal powder itself is small, preferably 0.8 or less. It is preferred that the distribution of Hc of the ferromagnetic metal powder is reduced. When the SFD is 0.8 or less, the electromagnetic conversion properties are good; the output is high; and the flux reversal is sharp to reduce the peak shift, so that it is suitable for the high-density digital magnetic recording. In order to reduce the distribution of Hc, the methods such as improving the particle size distribution of goethite or preventing the sintering are available for the ferromagnetic metal powder.

The magnetic recording medium having a squareness ratio of 0.82 or more and a SFD of 0.5 or less is particularly preferred.

The hexagonal ferrite powders include substitution products such as barium ferrite, strontium ferrite, lead ferrite and calcium ferrite, Co substitution ferrite and the like, barium ferrite being preferred among them. Specifically, a magnetoplumbite-type barium ferrite and strontium ferrite, a magnetoplumbite-type ferrite whose surface is coated with spinel, and a magnetoplumbite-type barium ferrite and strontium ferrite partly containing a spinel phase are included.

The ferromagnetic metal powder may contain, other than specific elements, the elements such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. Generally, those containing the elements such as Co—Zn, Co—Ti, Co—Ti—Zr, Co—Ti—Zn, Ni—Ti—Zn, Nb—Zn—Co, Sb—Zn—Co and Nb—Zn can be used. Some raw materials and production methods may contain impurities peculiar to them.

The average tabular diameter of hexagonal ferrite powders is preferably 50 nm or less, more preferably 40 nm or less, most preferably from 10 to 35 nm.

In particular, when reproducing with a magnetoresistive head in order to increase track density, the average tabular diameter is preferably 50 nm or less for reducing noise. The average tabular ratio that is the arithmetic mean of the tabular ratio (tabular diameter/thickness) is preferably from 1 to 15, more preferably from 1 to 8.

Small average tabular ratio is preferred because of high degree of filling, but may be lacking in sufficient orientation. The average tabular ratio of larger than 15 may increase noise due to the stacking between powders. The 1 BET for the powder having the size of this range generally shows the value from 10 to 200 m$^2$/g. The S$_{BET}$ generally agrees with the arithmetic calculation from the tabular diameter and thickness of the powders Generally, the smaller distribution of the tabular diameter and thickness of the powders is preferred. Although it is difficult to convert them into numbers and the distribution is often not the normal distribution, the coefficient of variation of the powder size (tabular diameter or thickness) is from 10 to 200%. In order to make the powder size distribution sharp, the powder-producing reaction system is made as uniform as possible and the produced powders are subjected to the distribution-improving treatment similar to that for the above-described nonmagnetic powders. For example, there is known a method for selectively dissolving ultra fine powders in an acid solution.

The coercivity (Hc) measured in hexagonal ferrite powders can be adjusted approximately in the range from $4 \times 10^3$ to $4 \times 10^4$ A/m (500 to 5,000 Oe). Higher Hc is advantageous for high-density recording, but it is limited by the capacity of a recording head. The Hc can be controlled by the powder size (tabular diameter and thickness), the type and amount of the elements contained, the substitution site of the elements, the conditions of the powder-producing reaction and the like.

The saturation magnetization (as) is in the range from 30 A·m$^2$/kg to 80 A·m$^2$/kg (30emu/g to 80 emu/g). The saturation magnetization (us) tends to be smaller for finer powders. Well known methods for changing the saturation magnetization (as) include compounding spinel ferrite to magnetoplumbite ferrite, selection of the type and the amount of the elements to be contained, and the like.

Further, it is possible to use a W-type hexagonal ferrite. Hexagonal ferrite powders are typically surface treated with a surface treatment agent compatible with a dispersing solvent and a binder before they are dispersed in the binder.

Inorganic compounds and organic compounds are used for the surface treatment agent. Typical examples of the main compounds include oxides or hydroxides of Si, Al, P and the like, and coupling agents such as various silane coupling agents, various titanium coupling agents and the like. These compounds can also be used when the hexagonal ferrite powders are dispersed. The amount to be deposited on the surface of the particles by the surface treatment is from 0.1 to 10% by weight relative to the hexagonal ferrite powders before the treatment.

The coercivity (Hc) of the magnetic layer in the embodiment of the present invention is generally from $143 \times 10^3$ A/m to $279 \times 10^3$ A/m (1,800 to 3,500 Oe), preferably from $143 \times 10^3$ A/m to $239 \times 10^3$ A/m (1,800 to 3,000 Oe). The maximum magnetic flux density (Bm) is generally from 100 mT to 700 mT (1,000 to 7,000 gauss (G)), preferably from 150 mT to 600 mT (1,500 to 6,000 G). When Hc and Bm are smaller tan the lower limit values, the output of short wavelength may not be obtained sufficiently. On the other hand, if they are larger than the upper limit values, the output may not be insured because the head to be used for the recording is saturated.

When the MR head is used for the reproduction head, the Bm is preferably low. In addition, when the MR head is used for the reproduction head, the most preferred magnetic recording medium has the coercivity of the ferromagnetic powders in the magnetic layer of $143 \times 10^3$ A/m to $239 \times 10^3$ A/m (1,800 to 3,000 Oe) and us of 40 to 120 A·m$^2$/kg (40 to 120 emu/g).

When the inductive head is used for the reproduction head, the most preferred magnetic recording medium has as of 120 to 170 A·m$^2$/kg (120 to 170 emu/g).

For the binder of the magnetic layer and the nonmagnetic layer of the magnetic medium according to the embodiment of the present invention, conventionally known thermoplastic resins, thermoset resins, reactive resins and mixtures thereof can be used. The thermoplastic resins that can be used have a glass transition temperature of −100 to 150° C., a number average molecular weight of 1,000 to 200,000, preferably 10,000 to 100,000, and a polymerization degree of about 50 to about 1,000.

The above-described binders include polymers and copolymers including, as constituting units, vinyl chloride, vinyl acetate, vinyl alcohol, maleic acid, acrylic acid, acrylates, vinylidene chloride, acrylonitrile, methacrylic acid, methacrylates, styrene, butadiene, ethylene, vinyl butyral, vinyl acetal, vinyl ether and the like, polyurethane resin and various rubber-based resins. The above binders can also be used for the preparation of the abrasive liquid.

In addition, the thermoset resins or reactive resins include phenol resins, epoxy resins, polyurethane curing resins, urea resins, melamine resins, alkyd resins, acrylic reactive resins, formaldehyde resins, silicone resins, epoxy-polyamide resins, mixers of polyester resins and isocyanate prepolymers, mixtures of polyester polyols and polyisocyanates, mixtures of polyurethanes and polyisocyanates and the like.

In order to obtain better dispersing effect of the ferromagnetic powders and durability of the magnetic layer from the above-described binders, it is preferred to use, as necessary, those in which at least one or more polar groups selected from —COOM, —SO$_3$M, —OSO$_3$M, —P=O(OM)$_2$, —O—P=(OM)$_2$, wherein M is a hydrogen atom or an alkali metal group, —OH, —NR$_2$, —N$^+$R$_3$, wherein R is a hydrocarbon group, an epoxy group, SH, CN and the like are introduced by copolymerization or addition reaction. The amount of these polar groups is from $10^{-1}$ to $10^{-8}$ mol/g, preferably from $10^{-2}$ to $10^{-6}$ mol/g.

The binder for use in the magnetic recording medium of the embodiment of the present invention is used in the range from 5 to 50% by weight, preferably from 10 to 30% by weight, relative to the ferromagnetic powder. Vinyl chloride resins are used in the range from 5 to 100% by weight; polyurethane resins are used in the range from 0 to 100% by weight; and polyisocyanates are used in the range from 0 to 50% by weight, relative to the total amount of binders. It is preferred to use them in combination. It is most preferred that the binder includes the polyurethane resin containing a cyclic structure and an ether group.

Moreover, the Tg of the magnetic layer is most preferably from 30° C. to 150° C. In addition, the degree of filling of the ferromagnetic powders for the magnetic layer can be calculated from the saturation magnetization (σs) and the Bm (maximum magnetic flux density) to be (Bm/4πσs). In the embodiment of the present invention, the value is preferably 1.7 g/ml or more, more preferably 1.9 g/ml or more, most preferably 2.1 g/ml or more.

When polyurethane is used in the embodiment of the present invention, it preferably has a glass transition temperature of −50 to 100° C., an elongation at break of 100 to 2,000%, a stress at break of 0.5 to $100 \times 10^{-2}$ MPa (0.05 to 10 kg/cm$^2$), and a yield point of 0.5 to $100 \times 10^{-2}$ MPa (0.05 to 10 kg/cm$^2$).

Polyisocyanates that can be used in the embodiment of the present invention include isocyanates such as tolylene diisocyanate, 4,4'-dipheylmethane diisocyanate, hexamethylene diisocyanate, xylylene diisocyanate, naphtylene-1,5-diisocyante, o-toluidine diisocyanate, isophorone diisocyanate, triphenymethane triisocyanate; products of these isocyanates with polyalcohols; polyisocyanates produced by the condensation of isocyanates; and the like.

Generally, those materials having various functions such as lubricants, abrasives, dispersants, antistatic agents, plasticizers, and mildewproofing agents can be contained depending on the purpose in the magnetic layer and/or nonmagnetic layer of the embodiment of the present invention.

Conductive particles can also be contained as an antistatic agent other than the nonmagnetic powders in the magnetic layer of the magnetic recording medium of the embodiment of the present invention. However, in the magnetic recording medium in which a nonmagnetic layer is provided between a support and a magnetic layer, it is preferred to minimize the amount of the conductive particles to be added in the upper layer, but to add them to the coating layers other than the upper layer, in order to maximize the saturation magnetic flux density of the upper layer.

The addition of carbon black as the antistatic agent is preferred in terms of reducing the surface electrical resistance across the medium. The carbon blacks that can be used in the embodiment of the present invention include carbon blacks such as furnace black for rubber, thermal black for rubber, black for color, conductive carbon black, acetylene black and the like. The carbon blacks preferably have $S_{BET}$ of 5 to 500 m$^2$/g, a DBP absorption of 10 to 1,500 ml/100 g, an average particle size of 5 to 30 nm, pH of 2 to 10, a water content of 0.1 to 10% by weight and a tap density of 0.1 to 1 g/ml.

Moreover, the carbon black may be dispersed in advance with the binder before added to the magnetic coating. When the carbon black is used in the magnetic layer, its amount to be used relative to the magnetic material is preferably in the range from 0.1 to 30% by mass. When the carbon black is used in the nonmagnetic layer, it is preferably contained in the range from 3 to 20% by mass relative to the inorganic nonmagnetic powders, wherein no carbon black is contained in the nonmagnetic powders.

Generally, the carbon black works not only as an antistatic agent, but also works for reducing the coefficient of friction, providing light blocking effect, improving film strength and the like, each of these functions being different depending on the carbon black. Thus, of course, these carbon blacks for use in the embodiment of the present invention can be used properly depending on the purpose based on the above indicated various properties such as the powder size, the oil absorption, the conductance and pH by changing their types, amounts and combinations. About the carbon blacks that can be used, for example, "The Carbon Black Handbook" edited by the Carbon Black Society of Japan can be referred to.

The embodiment of the present invention can also be preferably used in the method for manufacturing a magnetic recording tape in which a nonmagnetic back layer is provided on the surface opposite to that on which the above magnetic layer is provided.

Preferred embodiments of the present invention will be listed below.

The magnetic recording medium in which the back layer of a magnetic recording tape is provided by applying a dispersion in which mainly carbon black is dispersed in a binder and which has a modulus of longitudinal elasticity of 5 to 10 GPa (50 to 1,000 kg/mm$^2$) is most preferred.

The magnetic recording medium of the embodiment of the present invention is preferably prepared by forming two or more coating layers on a support. The methods for forming the same may include a sequential application method (wet-on dry method) and a continuous application method (wet-on-wet method).

The thickness of the magnetic recording medium of the embodiment of the present invention is generally from 1 to 100 μm, preferably from 3 to 20 μm when used in a tape form, preferably from 40 to 80 μm when used as a flexible disk, and the nonmagnetic layer provided on the support has a thickness generally from 0.5 to 10 μm, preferably from 0.5 to 3 μm.

Moreover, other layers than the above-described magnetic layer and the above-described nonmagnetic layer can be formed depending on the purpose. For example, a primer layer may be provided for improving adhesive properties between a support and a lower layer. This layer has a thickness generally from 0.01 to 2 μm preferably from 0.05 to 0.5 μm. In addition, a back layer may be provided on the side opposite to the magnetic layer of the support This layer has a thickness generally from 0.1 to 2 μm, preferably from 0.3 to 1.0 μm. Known materials can be used for the primer layer and the back layer. The magnetic recording medium in which the back layer has a surface electrical resistance of $1 \times 10^6$ Ω/square or less is most preferred.

The support for use in the embodiment of the present invention is not particularly limited, but those commonly used can be used. Examples of materials forming the support can include films of various synthetic resins such as polyethylene terephthalate, polyethylene, polypropylene, polycarbonate, polyethylene naphthalate, polyamide, polyamide-imide, polyimide, polysulfone and polyethersulfone; and metal foils such as an aluminum foil and a stainless steel foil.

In order to effectively achieve the object of the embodiment of the present invention, the surface roughness of the support is preferably 0.03 μm or less, more preferably 0.02 μm or less, most preferably 0.01 μm or less, as expressed by the center-plane average surface roughness (Ra: cutoff value 0.25 mm).

The support for use in the embodiment of the present invention preferably has a F-5 value in the web-running direction of 50 to 500×10$^{-3}$ GPa (5 to 50 kg/mm$^2$) and a F-5 value in the web-width direction of 30 to 300×10$^{-3}$ GPa (3 to 30 kg/mm$^2$). The F-5 value in the web-running direction is generally higher than that in the web-width direction, but not limited when it is necessary to increase the strength in the width direction in particular.

Moreover, the heat shrinkages at 100° C. for 30 minutes of the support in the web-running and width directions are preferably 3% or less, more preferably 1.5% or less; and the heat shrinkages at 80° C. for 30 minutes are preferably 1% or less, more preferably 0.5% or less. The support preferably has a strength at break of 0.05 to 1 GPa (5 to 100 kg/mm$^2$) and a modulus of 1 to 20 GPa (100 to 2,000 kg/mm$^2$), in both directions.

The magnetic recording medium of the embodiment of the present invention is obtained by dispersing by kneading nonmagnetic powders or ferromagnetic powders with a binder together with other additives as necessary in an organic solvent, applying the nonmagnetic coating and magnetic coating on a support, subjecting to orientation as necessary and drying.

The magnetic recording medium of the embodiment of the present invention may be used as tapes for video and audio applications, or as flexible disks and magnetic disks for data recording applications. However, it is particularly effective as the media for digital recording applications in which a loss of the signal due to the occurrence of dropout is critical. Furthermore, a high-density large-capacity magnetic recording medium having high electromagnetic conversion properties and good overwrite characteristics can be obtained by forming a lower layer as a nonmagnetic layer and reducing the thickness of the magnetic layer on the lower layer to 0.5 μm or less.

Examples of the embodiments of the method for manufacturing the magnetic recording medium according to the embodiment of the present invention have been described as above, but the embodiment of the present invention is not limited to the above-described examples of embodiments, and various other embodiments can be employed.

EXAMPLES

The examples of the present invention will now be described in contradistinction to comparative examples. In each of the examples below, the expression "parts" means "parts by weight".

In each of the examples, the layer structure was employed in which between a magnetic layer and a nonmagnetic support, there is provided a nonmagnetic intermediate layer mainly containing nonmagnetic powders and a binder.

In Examples 1 to 4 of the present invention, the magnetic liquid and the abrasive liquid were each separately subjected to dispersion treatment in the magnetic coating producing apparatus 10 having the structure shown in FIG. 1; the abrasive liquid was then subjected to dispersion/filtration in the ultrasonic dispersion filtration system 12; and then the magnetic liquid was mixed with the abrasive liquid.

On the other hand, in Comparative Examples 1 to 3, the magnetic liquid was mixed with the abrasive liquid without using the ultrasonic dispersion filtration system 12.

(1) Structure of the nonmagnetic intermediate layer (common to each of the examples)

| | |
|---|---|
| Nonmagnetic powder α-Fe$_2$O$_3$ | 80 parts |
| Average major axis length | 0.1 μm |
| Specific surface area by BET method | 48 m$^2$/g |
| pH | 8 |
| Fe$_2$O$_3$ content | 90 percent or more |
| DBP absorption | 27–38 ml/100 g |
| Surface treatment agent | Al$_2$O$_3$ |
| Carbon black | 20 parts |
| Average primary particle diameter | 16 μm |
| DBP oil-absorption | 80 ml/100 g |
| pH | 8.0 |
| Specific surface area by BET method | 250 m$^2$/g |
| Volatiles | 1.5% |
| Vinyl chloride copolymer MR-110 made by ZEON Corporation | 8 parts |
| Polyester polyurethane resin neopentylglycol/caprolactonepolyol/MDI = 0.9/2.6/1 containing 1 × 10$^{-4}$ eq/g of —SO$_3$Na group | 4 parts |
| Tg | 65° C. |
| Phenylphosphonic acid | 3 parts |
| Butylstearate | 1 part |
| Stearic acid | 1 part |
| Methyl ethyl ketone | 100 parts |
| Cyclohexanone | 50 parts |

(2) Structure of the magnetic layer (common to each of the examples)

| | |
|---|---|
| a) Ferromagnetic metal fine powder | 100 parts |
| Composition | Fe/Co = 70/30 |
| Hc | 195 × 10$^3$ A/m (2,450 Oe) |
| Specific surface area by BET method | 43 m$^2$/g |
| Crystallite size | 16 nm, |
| Surface treatment agent | Al$_2$O$_3$, |
| Particle size (major axis) | 0.125 μm, |
| flat acicular particle, longer width length (minor axis length)/shorter width length = 0.025/0.01 | |
| σs: 157 A · m$^2$/kg (157 emu/g) | |
| Polyester polyurethane resin neopentylglycol/caprolactonepolyol/ MDI = 0.9/2.6/1 containing 1 × 10$^{-4}$ eq/g of —SO$_3$Na group | 10 parts |
| Carbon black (particle size 0.10 μm) | 0.5 parts |
| Butylstearate | 1.5 parts |
| Stearic acid | 0.5 parts |
| Methyl ethyl ketone | 90 parts |
| Cyclohexanone | 30 parts |
| Toluene | 60 parts |
| b) α-Alumina (particle size 0.18 μm) | 4.5 parts |
| MR110 | 0.45 parts |
| Cyclohexanone | 9.2 parts |

Each of the components in the above-described coating for the nonmagnetic intermediate layer except stearic acid and butylstearate was kneaded in an open kneader, and then dispersed with zirconia beads using a sand mill. To the resultant dispersion, 3 parts of polyisocyanate were added, and a solution in which stearic acid and butyl stearate were dissolved in methyl ethyl ketone and cyclohexanone was added and stirred to prepare a nonmagnetic coating liquid having a solid content of 28% and a solvent ratio of methyl ethyl ketone:cyclohexanone=4:6.

The above-described magnetic material, a nonmagnetic granular powder, carbon black, a vinyl chloride copolymer, methyl ethyl ketone and cyclohexanone were kneaded in an open kneader and dispersed with zirconia beads using a sand mill to prepare the magnetic liquid.

The abrasive liquid for Example 1 was first prepared as a mixture of alumina:vinyl chloride copolymer MR110:cyclohexanone=45:4.5:92. Then, the mixture was subjected to ultrasonic dispersion filtration treatment in the structure shown in FIG. 2 using a cross-flow type (circulation type) ultrasonic dispersion filtration apparatus 40 (ultrasonic homogenizer, specifications; nominal output: 1,200 W, frequency: 20 kHz, diameter of irradiation part area. 50 mm, gap between the irradiation part and holder: 3 mm, amplitude: 30 μm, using a filter made of sintered stainless steel fiber and having diameter: 80 mm, thickness: 1.5 mm nominal filtration performance: 1 μm). Thereafter, the abrasive liquid was mixed with the magnetic liquid in the conditions shown in Table 1.

The abrasive liquid for Example 2 was first prepared as a mixture of alumina:vinyl chloride copolymer MR110:cyclohexanone=45:4.5:92. Then, the mixture was subjected to ultrasonic dispersion filtration treatment for residence time for dispersing of 1 minute in the structure shown in FIG. 2 using the cross-flow type (circulation type) ultrasonic dispersion filtration apparatus 40 with the same specifications as Example 1. Then, the abrasive liquid was supplied through the liquid-supplying pipe 23G in FIG. 2 to the liquid tank 21 in FIG. 4, and then subjected to ultrasonic dispersion filtration treatment for residence time for dispersing of 1 minute in the structure shown in FIG. 4 using the cross-flow type (circulation type) ultrasonic dispersion filtration apparatus 40 using as the filter 36 a filter made of sintered stainless steel fiber and having diameter: 80 mm, thickness: 1.5 mm, nominal filtration performance: 0.1 μm. Thereafter, the abrasive liquid was transferred through the liquid-supplying pipe 23H, and was mixed with the magnetic liquid in the conditions shown in Table 1.

The abrasive liquid for Example 3 was first prepared as a mixture of alumina:vinyl chloride copolymer MR110:cyclohexanone=45:4.5:92. Then, the mixture was subjected to sand mill dispersion treatment for 360 minutes by a vertical sand mill dispersion apparatus with zirconia media beads of 1 mm in diameter at loading ratio ((volume of the media beads)/(volume of the abrasive liquid+volume of the media beads)) of 60%. Then, the mixture was transferred form the sand mill dispersion apparatus so as to be subjected to ultrasonic dispersion filtration treatment in the structure shown in FIG. 2 using the cross-flow type (circulation type) ultrasonic dispersion filtration apparatus 40 with the same specifications as Example 1. Thereafter, the abrasive liquid was mixed with the magnetic liquid in the conditions shown in Table 1.

The abrasive liquid for Example 4 was first prepared as a mixture of alumina: cyclohexanone=35:65 (i.e., with no binders). Then, the mixture was subjected to ultrasonic dispersion treatment for 30 minutes using a batch type ultrasonic dispersion apparatus made by Nihon Seiki Seisakusho Co., Ltd. (brand name: USDS-1, specifications; nominal output: 600 W, frequency: 20 kHz, ultrasonic irradiation by two pieces of vibrator of 36 mm in diameter, dissolver-type impeller of 1,000 rpm). Then, the mixture was subjected to ultrasonic dispersion filtration treatment in the structure shown in FIG. 2 using the cross-flow type (circulation type) ultrasonic dispersion filtration apparatus 40 with the same specifications as Example 1. Thereafter, the abrasive liquid was mixed with the magnetic liquid in the conditions shown in Table 1.

In each of Examples 1 to 4, the mixture of the abrasive liquid and the magnetic liquid was stirred, and a solution in which stearic acid and butyl stearate were dissolved in methyl ethyl ketone and cyclohexanone was added and stirred to prepare a magnetic coating liquid. The magnetic liquid and the nonmagnetic liquid were each filtered by a filter having an average pore size of 1 μm to prepare each of the coating liquids.

The liquid-supplying rate can be calculated from the transfer speed of the support to be described below, coating thickness and coating width. In FIG. 1 shown as an example of one embodiment, the ultrasonic dispersion filtration systems 12 are composed of two sets, but it may be one set as described above or may be a cascade structure of three sets or more depending on the liquid-supplying rate or the capacity of the apparatus.

A consumer DVC video tape was manufactured as described below. A polyethylene naphthalate support having a thickness of 5.2 μm and a roughness component strength of 0.03 nm$^2$ at a wavelength of 4.3 μm in a roughness spectrum obtained with an atomic force microscope (AFM) was used. On the support, the nonmagnetic layer coating liquid was applied such that it has a thickness after drying of 1.5 μm, and immediately after this, the magnetic layer was subjected to simultaneous double coating on the nonmagnetic coating liquid such that it has a thickness after drying of 0.2 μm. The both layers were oriented while they were wet by a cobalt magnet having a magnetic force of 300 mT (3,000 G) and a solenoid having a magnetic force of 15 mT (1,500 G) and dried. Then, they were subjected to calendering using a seven-roll calender composed only of metal rolls at a temperature of 85° C., a linear pressure of 3,500 N/cm (350 kgf/cm) and a speed of 50 m/minute, and slit to a width of 6.35 mm.

Methods for evaluating Examples 1 to 4 and Comaparative Examples 1 to 3 will now be described.

(1) Carrier/Noise ratio (C/N) measurement

The output was measured using a drum tester. The bead that was used is a MIG head having Bs of 1.2 T and a gap length of 0.22 μm, for recording and reproduction.

The bead/medium relative velocity at the recording and reproduction was 10.5 m/sec to record the single frequency signal at 21 MHz. The reproduction spectrum ratio at a location 1 MHz apart from the carrier signal output and carrier signal was observed with a spectrum analyzer made by Shibasoku Co., Ltd.

(2) Thickness measurement

A sample tape was cut with a diamond cutter into a thickness of about 0.1 μm in a longitudinal direction and was observed and taken a photograph with a transmission electron microscope at a magnification of 100,000. After drawing lines on the surface of the magnetic layer and at the interface of the magnetic layer/nonmagnetic layer, the measurement was carried out by an image processing device IBAS2 made by Carl Zeiss Inc. In the case where the measuring length was 21 cm, measurement was carried out 85 to 300 times to calculate the average value d and the standard deviation σ.

(3) Running durability

A virgin tape of 60 minute long was repeatedly run 100 times continuously at indoor environment (room temperature: 23° C., relative humidity: 70%). The camcorder DJ-1 made by Matsushita Electric Industrial Co., Ltd. was used to evaluate the tape damages on the sliding surface thereof after the running according to the criteria below:

When the damage was confirmed by a ×200 magnification photograph Poor

When the damage was scarcely confirmed by a ×200 magnification photograph Good

When the damage was not confirmed by a ×200 magnification photograph Excellent (4) Mag μ value The tape was slid 1 to 100 passes with the magnetic layer surface being touched at a load of 10 g, a speed of 14 mm/s and a wrap of 180 degrees using a member of SUS420J of 4 mm in diameter at indoor environment. The sliding resistance was measured to calculate the coefficient of friction with the magnetic layer surface from die Euler's formula (5) Repeated HW A virgin tape of 60 minute long was repeatedly run 100 times continuously at indoor environment (room temperature: 23° C., relative humidity: 70%). The camcorder DJ-1 made by Matsushita Electric Industrial Co., Ltd. was used for this test. The amount of the head projection before and after the running was measured by the HISOMET optical microscope made by Union Optical Co., Ltd. to calculate the amount of wear of a head.

Production conditions and evaluation results are summarized in Table 1 below.

TABLE 1

|  | Example 1 | Example 2 | Example 3 | Example 4 | Comp. Example 1 | Comp. Example 2 | Comp. Example 3 |
|---|---|---|---|---|---|---|---|
| Major axis length of magnetic material (nm) | 60 | 60 | 60 | 60 | 60 | 60 | 60 |
| Dispersion method | separate dispersion | separate dispersion | separate dispersion | separate dispersion | simultaneous | separate dispersion | separate dispersion |
| Dispersion media | zirconia | zirconia | zirconia | zirconia | zirconia | zirconia | zirconia |
| Media particle size in diameter (mm) | 1 | 1 | 1 | 1 | 1 | 1 | 1 |
| Volume ratio % in dispersion apparatus occupied by media in magnetic liquid | 60 | 60 | 60 | 60 | 60 | 60 | 60 |
| Time for dispersing magnetic liquid (min) (magnetic liquid without abrasive for separate dispersion) | 360 | 360 | 360 | 360 | 360 | 360 | 360 |
| Dispersion treatment of abrasive liquid | ultrasonic | ultrasonic | sand mill | ultrasonic | sand mill | sand mill | ultrasonic |

TABLE 1-continued

|  | Example 1 | Example 2 | Example 3 | Example 4 | Comp. Example 1 | Comp. Example 2 | Comp. Example 3 |
|---|---|---|---|---|---|---|---|
| Residence time for dispersing abrasive liquid | 2 min in flow | 2 min in flow | 360 min | batch: 30 min flow: 20 sec | (360 min) | 360 min | 2 min in flow |
| Solid concentration of abrasive liquid | 35% | 35% | 35% | 35% | — | 35% | 35% |
| Return dispersion of abrasive liquid | no | no | ultrasonic dispersion | no | — | ultrasonic dispersion | no |
| Filtration of abrasive liquid (1) high pass filter | cut coarse particles, 1 µm or less | cut coarse particles, 1 µm or less | cut coarse particles, 1 µm or less | cut coarse particles, 1 µm or less | no | no | no |
| Filtration of abrasive liquid (2) low pass filter | no | cut fine particles, 0.1 µm or more | cut fine particles, 0.1 µm or more | cut fine particles, 0.1 µm or more | no | no | no |
| Method for mixing magnetic liquid/ abrasive liquid | dissolver-type impeller, peripheral speed of 12 m/s, 30 min | dissolver-type impeller, peripheral speed of 12 m/s, 30 min | dissolver-type impeller, peripheral speed of 12 m/s, 30 min | dissolver-type impeller, peripheral speed of 12 m/s, 30 min | — | dissolver-type impeller, peripheral speed of 12 m/s, 30 min | dissolver-type impeller, peripheral speed of 12 m/s, 30 min |
| Added amount of abrasive: Parts by weight | 4.5 | 7.5 | 7.5 | 7.5 | 4.5 | 4.5 | 4.5 |
| Layer structure | multiple layers | multiple layers | multiple layers | multiple layers | multiple layers | multiple layers | multiple layers |
| Magnetic layer thickness/nonmagnetic layer thickness (µm) | 0.2/1.5 | 0.2/1.5 | 0.2/1.5 | 0.2/1.5 | 0.2/1.5 | 0.2/1.5 | 0.2/1.5 |
| C/N (dB) | 2.2 | 3 | 2.8 | 2.8 | 0 | unable to measure | 2 |
| Running durability | good | excellent | excellent | excellent | poor | poor | good |
| Mag µ value: 1 pass; 100 passes | 0.26; 0.26 | 0.24; 0.25 | 0.27; 0.28 | 0.24; 0.24 | 0.34; unable to measure due to sticking | 0.5; unable to measure due to sticking | 0.24; 0.25 |
| Repeated HW (µm/20 h) | 0.1 | 0.1 | 0.1 | 0.2 | 0.8 | unable to measure | 0.5 |

In Table 1, "Return dispersion of abrasive liquid" means the re-dispersion treatment carried out for breaking the reaggregation of the abrasives before application. In the item "Filtration of abrasive liquid", the high pass filter is used for removing the abrasive particles having a particle size of the upper limit size to be classified or more, and the low pass filter is used for removing the abrasive particles having a particle size of the lower limit size to be classified or less.

Comparative Example 1 is the case where the magnetic liquid mainly comprising a ferromagnetic powder and a binder was kneaded in an open kneader, added with abrasives and simultaneously dispersed with zirconia beads using a sand mill. This was used as a type for comparison.

The medium in Comparative Example 1 had abrasives that are broken excessively, resulting in the reduction of the size of the abrasive particles on the surface of the magnetic layer and the increase of the number of particles. Consequently, the running durability has been reduced and the C/N has also been reduced. In addition, the amount of wear of a head was large.

Comparative Example 2 is the case where the abrasive liquid was subjected to dispersion treatment with zirconia beads using a sand mill so as to have a residence time of 360 minutes; and this abrasive liquid was subjected to the ultrasonic dispersion treatment on the same day that the coating liquid was prepared, and was mixed by agitation with the magnetic liquid without filtration to prepare a magnetic coating. The abrasives are broken more excessively than Comparative Example 1, resulting in the reduction of durability to the extent where the measurements of the electromagnetic conversion properties (C/N) and the wear of a head were impossible due to the chipping of the magnetic layer.

Comparative Example 3 is the case where the dispersion of the abrasive liquid by a sand mill was changed to the dispersion by an ultrasonic wave, relative to Comparative Example 2, and was mixed by agitation with the magnetic liquid without filtration after the dispersion to prepare a magnetic coating. The medium had good C/N and running durability, but showed large amount of wear of a head.

Examples 1 and 2 are the cases where the abrasive liquid is filtered to make a magnetic coating, relative to Comparative Example 3, It was possible to manufacture the medium that shows less wear of a head than Comparative Example 3 and has good C/N and running durability.

Example 2 is the case where fine particles were cut in the filtration of the abrasive liquid, relative to Example 1. The medium from Example 2 had the improved C/N compared with Example 1.

Example 3 is the case where the abrasive liquid was subjected to the dispersion similar to Comparative Example 2, then subjected to filtration, and then mixed by agitation with the magnetic liquid to prepare a magnetic coating. The medium had the improved C/N and showed less wear of a head compared with Comparative Examples.

Example 4 is die case where the abrasive liquid including no binders was subjected to dispersion by both the batch type ultrasonic batch type ultrasonic dispersion apparatus and the cross-flow type ultrasonic dispersion filtration apparatus. The medium had the improved C/N and showed less wear of a head compared with Comparative Examples.

As described above, according to the present invention, the magnetic liquid and the abrasive liquid are each separately subjected to dispersion treatment, the abrasive liquid is then filtered; and after that the both liquids are mixed, so that coarse particles in the abrasives can be removed. Thus, the magnetic recording medium that has a smooth magnetic layer surface, good electromagnetic conversion properties and excellent running durability and shows little wear of a head can be obtained.

It should be understood, however, that there is no intention to limit the invention to the specific forms disclosed, but on the conta, the invention is to cover all modifications, alternate constructions and equivalents falling within the spirit and scope of the invention as expressed in the appended claims.

What is claimed is:

1. A method for manufacturing a magnetic recording medium in which a magnetic coating is applied on a non-magnetic support, the magnetic coating including: a magnetic liquid containing a ferromagnetic powder and a binder; and an abrasive liquid containing an abrasive and the binder, the method comprising the steps of:
   subjecting the magnetic liquid to dispersion treatment;
   subjecting the abrasive liquid to dispersion treatment separately from the magnetic liquid, and then filtering the abrasive liquid; and
   then mixing the magnetic liquid and the abrasive liquid.

2. The method as defined in claim 1, wherein the filtering step for the abrasive liquid comprises the step of carrying out classification with a cross-flow type filtration apparatus.

3. The method as defined in claim 1, wherein the dispersion treatment of the abrasive liquid is carried out by applying an ultrasonic wave.

4. The method as defined in claim 3, wherein the filtering step for the abrasive liquid comprises the step of carrying out classification with a cross-flow type filtration apparatus.

5. A method for manufacturing a magnetic recording medium in which a magnetic coating is applied on a non-magnetic support, the magnetic coating including: a magnetic liquid containing a ferromagnetic powder and a binder; and an abrasive liquid containing an abrasive and a solvent, the method comprising the steps of:
   subjecting the magnetic liquid to dispersion treatment;
   subjecting the abrasive liquid to dispersion treatment separately from the magnetic liquid, and then filtering the abrasive liquid; and
   then mixing the magnetic liquid and the abrasive liquid.

6. The method as defined in claim 5, wherein the filtering step for the abrasive liquid comprises the step of carrying out classification with a cross-flow type filtration apparatus.

7. The method as defined in claim 5, wherein the dispersion treatment of the abrasive liquid is carried out by applying an ultrasonic wave.

8. The method as defined in claim 7, wherein the filtering step for the abrasive liquid comprises the step of carrying out classification with a cross-flow type filtration apparatus.

* * * * *